UNITED STATES PATENT OFFICE 2,594,308

POTATO JUICE

Edward G. Heisler and Robert H. Treadway, Philadelphia, Pa., assignors to the United States of America as represented by the Secretary of Agriculture No Drawing. Application July 5, 1951, Serial No. 235,356

1 Claim. (Cl. 99—155)

(Granted under the act of March 3, 1883, as amended April 30, 1928; 370 O. G. 757)

The invention herein described may be manufactured and used by or for the Government of the United States of America for governmental purposes throughout the world without the payment to us of any royalty thereon.

This invention relates to the production of potato juice.

Potato juice has been suggested for use as an article of food because of its high vitamin, mineral, and protein content. However, fresh potato juice rapidly undergoes deterioration with darkening and separation of a black sediment, and becomes unfit for human consumption within a very short time.

In accordance with this invention, potatoes are maintained at a temperature of about from —10° to —20° C. for a length of time sufficient to attain a thorough freezing of the tubers, and are then thawed to about room temperature (25° C.) and pressed to recover the major portion of their juice. Approximately 70 percent of the juice can thus be recovered, for example, by means of a Carver press at 4000 p. s. i. This freshly expressed juice is clear and light reddish-brown, but darkens slowly on standing even under refrigeration and eventually acquires the black color characteristic of deteriorated potato juice. However, if within about 1–2 hours after being expressed this juice is heated to about 80–100° C. and maintained at this temperature until the separation of the heat coagulable constituents has been substantially completed, and the resulting precipitate is removed, for example by filtration, the clear light yellow juice so obtained does not undergo any appreciable alteration on subsequent storage and can be preserved by canning. This potato juice contains about 4–5 percent by weight of solids, is rich in vitamin C, amino acids, and minerals, and retains the flavor of fresh potatoes. It is thus well adapted for use as an article of food, either as such with or without addition of salt, sodium glutamate or other flavoring agents, or blended with other vegetable juices, and can also be advantageously utilized in the preparation of soups and similar food products.

The heat coagulated proteinous materials obtained as a byproduct of our process contains about 20 percent of nitrogen on the dry weight basis and can be used as a food or mixed with the potato press cake and the mixture used as a feed, or it can be combined with other feed materials to increase their nutritive value.

The potato press cake contains about 25 percent moisture, a small amount (about 0.5%) of nitrogen, about 3 percent of crude fiber and about 70 percent of starch. It can be utilized to make sirup, or adhesives, or processed to yield a high-grade potato starch.

We claim:

The process of producing potato juice which comprises maintaining potatoes at a temperature of about from —10° to —20° C. for a length of time sufficient to cause thorough freezing of the tubers, thawing the potatoes to about room temperature, expressing the juice from the thawed potatoes, heating the juice within a period not substantially exceeding 2 hours after expression to about 80°–100° C. until separation of the heat coagulable constituents of the juice is substantially completed, and separating the resulting precipitate from the juice.

EDWARD G. HEISLER.
ROBERT H. TREADWAY.

No references cited.